United States Patent [19]

Smith, Jr.

[11] Patent Number: 4,625,110
[45] Date of Patent: Nov. 25, 1986

[54] EPITHERMAL NEUTRON POROSITY MEASUREMENT
[75] Inventor: Harry D. Smith, Jr., Houston, Tex.
[73] Assignee: Halliburton Company, Duncan, Okla.
[21] Appl. No.: 544,048
[22] Filed: Oct. 24, 1983
[51] Int. Cl.$^4$ ............................................... G01V 5/10
[52] U.S. Cl. ....................................... 250/269; 250/262
[58] Field of Search ................................. 250/269, 262
[56] References Cited

U.S. PATENT DOCUMENTS 3,487,211 12/1969 Youmans ............................ 250/269
4,097,737 6/1978 Mills, Jr. ............................ 250/269
4,409,481 10/1983 Smith, Jr. et al. ................... 250/262
4,424,444 1/1984 Smith, Jr. et al. ................... 250/262

Primary Examiner—Alfred E. Smith
Assistant Examiner—Carolyn E. Fields
Attorney, Agent, or Firm—William J. Beard

[57] ABSTRACT

Earth formations penetrated by a borehole are irradiated with pulses of fast neutrons. The epithermal neutrons resulting from moderation of the fast neutrons are detected in a plurality of time intervals to determine the porosity of the adjacent earth formations independently of lithology. Borehole effects are taken into account by separately determining borehole and formation epithermal neutron decay constants.

16 Claims, 4 Drawing Figures

OVERLAY OF EPITHERMAL BUILDUP/DECAY CURVES FOR 2% & 38%

EPITHERMAL NEUTRON BUILDUP/DIEAWAY RATIO ($R_e$) IN UNCASED FORMATIONS

EPITHERMAL NEUTRON POROSITY MEASUREMENT

BACKGROUND OF THE INVENTION

The present invention relates to the logging of earth formations, and more particularly to neutron irradiation measurement techniques for in situ determination of earth formation porosities in the vicinity of a borehole passing therethrough.

Present neutron methods for obtaining porosity measurements analyze secondary neutron populations produced by either steady-state or pulsed sources of high energy neutrons. Steady-state sources typically produce neutrons having mean energies of approximately 4-5 Mev. Pulsed (d,t) sources produce neutrons having energies of 14 Mev. In both, the neutrons are moderated by interaction with the nuclei of the materials in the borehole and the surrounding earth formations. When the neutron energies have moderated to below about 0.05 electron volts, they come into thermal equilibrium with their environmnt. At this point they are referred to as "thermal" neutrons and, on average, lose no further energy. At energies just above thermal up to around 100 electron volts, the neutrons are referred to as "epithermal" neutrons.

Upon reaching thermal energy range, the neutrons diffuse through the formation and borehole until they are captured by nuclei in the constituent materials. The rate at which a zone of material (formation or borehole) captures the neutrons (or more precisely, the probability of capture) is referred to as the macroscopic capture cross-section of the zone. The macroscopic capture cross-section is, in turn, a result of the combined microscopic capture cross-sections of the various constituent elements and materials constituting the zone. The capture cross-section of chlorine for thermal neutrons is considerably higher than that of most other elements commonly encountered in earth formations of interest. Accordingly, thermal neutron macroscopic capture cross-section measurements can give a good indication of the saline content of the fluids in the zone in question. By combining such information about the saline content of the fluids in the pore spaces of an adjacent earth formation with information about the formation water salinity, porosity measurements, and measurements of formation shaliness, information can be derived which can discriminate oil from salt water filled pore spaces in the vicinity of a well borehole.

Since thermal neutrons are absorbed by other materials as well as chlorine, the macroscopic capture cross-section is also responsive to borehole conditions and to the lithology of the formation materials. Present thermal neutron techniques for obtaining porosity measurements from pulsed neutron tools therefore often involve taking a ratio of the capture gamma ray count rates in two detectors spaced in the tool at different distances from the neutron source. By taking the ratio of the counts, many of these perturbations and some of the effects of borehole parameters can be reduced. However, to take such ratios the detectors must be gain stabilized, or at least their count rates must drift in exactly the same manner. Pulsed neutron measurement ratios thus obtained are therefore still borehole dependent, dependent on the capture cross-section of the formation, and can be dependent on the specific capture gamma ray energy distribution from the elements present (i.e., can be lithology dependent). In addition, the measurement is often statistically limited because the more distant detector used in the ratio measurement experiences a relatively low count rate in many formations. Nevertheless, a good qualitative porosity indication can often be derived.

Epithermal neutrons behave quite differently in the borehole and the formation than thermal neutrons. Epithermal neutron populations are depleted primarily through moderation by collisions (predominantly elastic) with formation nuclei, rather than by absorption. Epithermal neutron populations are therefore not affected by the various (i.e., borehole and formation) capture cross-sections. Instead, they are moderated and depleted most quickly by collisions with nuclei of similar mass: hydrogen. Since most pore space is filled by hydrogen-rich materials (hydrocarbons or water) while solid formation materials contain much less hydrogen, the rate of decay of an epithermal neutron population gives a good quantitative indication of the amount of hydrogen-containing material present. This, in turn, can be used to measure formation porosities. Further, such epithermal neutron measurements may be made without requiring two separate detectors. U.S. Pat. Nos. 4,097,737 and 4,266,126, for example, give examples of single detector epithermal neutron methods for measuring formation porosities while minimizing the effects of lithology.

However, prior art epithermal neutron porosity methods have typically suffered from several limitations. For example, borehole effects are commonly ignored. That is, since borehole moderation is usually faster than formation moderation, the several measurements which are made are usually delayed until the borehole component has had sufficient time to die away. However, some residual borehole component will usually be present, and neutrons can always be expected to reenter the borehole from the adjacent earth formation.

Another disadvantage of delaying the measurement gates to allow the borehole component to dissipate is the loss of important information during this long waiting period. Count rates are high and statistically important during early portions of the epithermal neutron moderation (or die-away) cycle, and such prior art delayed measurement methods fail to utilize this information. Further, as disclosed by the present invention, valuable information can be obtained even earlier from the nature of the epithermal neutron population buildup during and just following the pulse of high energy neutrons.

An important improvement in thermal (as distinguished from epithermal) neutron measurements is disclosed in U.S. patent application Ser. No. 383,680, filed June 1, 1982, now U.S. Pat. No. 4,409,481, and assigned to the assignee of the present invention, the disclosure of which is incorporated herein by reference. In this invention, at least four, and preferably six, capture gamma ray counts are made starting immediately after thermalization of the fast neutrons. From these measurements both the borehole thermal neutron lifetime component and the earth formation thermal neutron lifetime component are individually calculated using least squares fitting of the count rate data. Rather than ignoring the borehole component, therefore, it is specifically identified, calculated, and separated from the formation component, substantially improving the accuracy of the formation thermal neutron lifetime measurement. Unfortunately, however, the prior art fails to teach how such an improved method might be applied to the measurement of lithology-independent epithermal neutron populations.

A need therefore remains for an accurate, sensitive, versatile, single-detector epithermal neutron porosity measurement method which is essentially indifferent to formation lithology and borehole effects.

SUMMARY OF THE INVENTION

Briefly, the present invention meets the above needs and purposes with an epithermal neutron porosity measurement method in which borehole effects can be determined separately from the formation epithermal neutron populations. The present invention also provides methods for improving statistical results by utilizing the data available from the entire history of the epithermal neutron populations which are produced by each pulse of high energy neutrons. The present invention thus teaches the use of data from the build-up of the epithermal neutron population as well as data from its die-away, in particular by taking the ratio of the count rate during the build-up to the count rate during the die-away.

With regard to the determination of borehole effects, a paper by J. Czubeck (Czubeck, J. A., "Pulsed Neutron Method for Uranium Well Logging", Geophysics, Vol 37, No. 1, February, 1972) indicated from both theory and experimental data that the formation epithermal neutron decay distribution following a neutron burst is, like that of thermal neutron decay, also exponential in form. It may be approximated by:

$$E(t) = A_o e^{-\alpha t/t_s}$$

where $A_o$ is a constant related to the initial number of neutrons emitted during the burst and the width and shape of the burst; $t_s$ is the slowing down (or moderation) time of the source neutrons in the formation, and $\alpha$ is a constant. Hence "$\alpha/t_s$" is an epithermal parameter analogous to "$\Sigma$" (the formation capture cross-section) for the thermal neutron distributions. Therefore, $\alpha/t_s$ is a measure of the epithermal neutron "absorption", where "absorption" represents the removal of epithermal neutrons due to thermalization. Experiments have shown that $t_s$ is not appreciably affected by lithology.

If a borehole epithermal neutron decay term is included in the total epithermal neutron count rate expression, then:

$$E(t) = A_{oB} e^{-\alpha_B t/t_{sB}} + A_{oF} e^{-\alpha_F t/t_{sF}}$$

where the "B" and "F" subscripts relate to the borehole and formation components respectively.

A comparison with well known prior art thermal neutron analyses will show that the epithermal neutron case, as described above, is essentially analogous thereto. What is also noteworthy, however, is that the prior art techniques usually delay measurements until t is sufficiently great that the borehole component has gone essentially to zero. According to the present invention, much earlier data, including even data developed by observing the build-up of the epithermal neutron population before the burst of fast neutrons has been concluded, will produce an even more sensitive and accurate measurement of formation and/or borehole hydrogen index or porosity.

It is therefore a feature of the present invention to provide an improved method for determining the porosity of earth formations in the vicinity of a borehole passing therethrough; an earth formation porosity measuring method employing detection of epithermal neutrons produced through moderation of bursts of fast neutrons periodically emitted into the earth formation under investigation; such a method in which the epithermal neutrons are detected in at least two predetermined intervals, one of which occurs substantially between the repetitive pulses of fast neutrons; in which the count rate signals are combined according to a predetermined relationship to obtain a measurement signal representative of the porosity of the surrounding earth formations; in which the predetermined relationship is one in which the signals are assumed to decay exponentially with time; in which four or more substantially contiguous intervals may be used, spanning the times of both the borehole and the formation moderation, and the signals therefrom combined to obtain measurement signals representative of the porosity of the surrounding earth formations; in which the first interval may substantially span the build-up of the epithermal neutron population and the second substantially the die-away thereof; in which the statistical formation measurements may be improved by taking the ratio of the measurement signals from the build-up to the die-away; and to accomplish the above purposes in an accurate, sensitive, versatile, single-detector neutron porosity measurement method which is essentially unaffected by formation lithology and borehole effects.

Other features and advantages of the invention will be apparent from the following description, the accompanying drawings and the appended claims.

DESCRIPTION OF THE PREFERRED EMBODIMENTS

Figure 1:
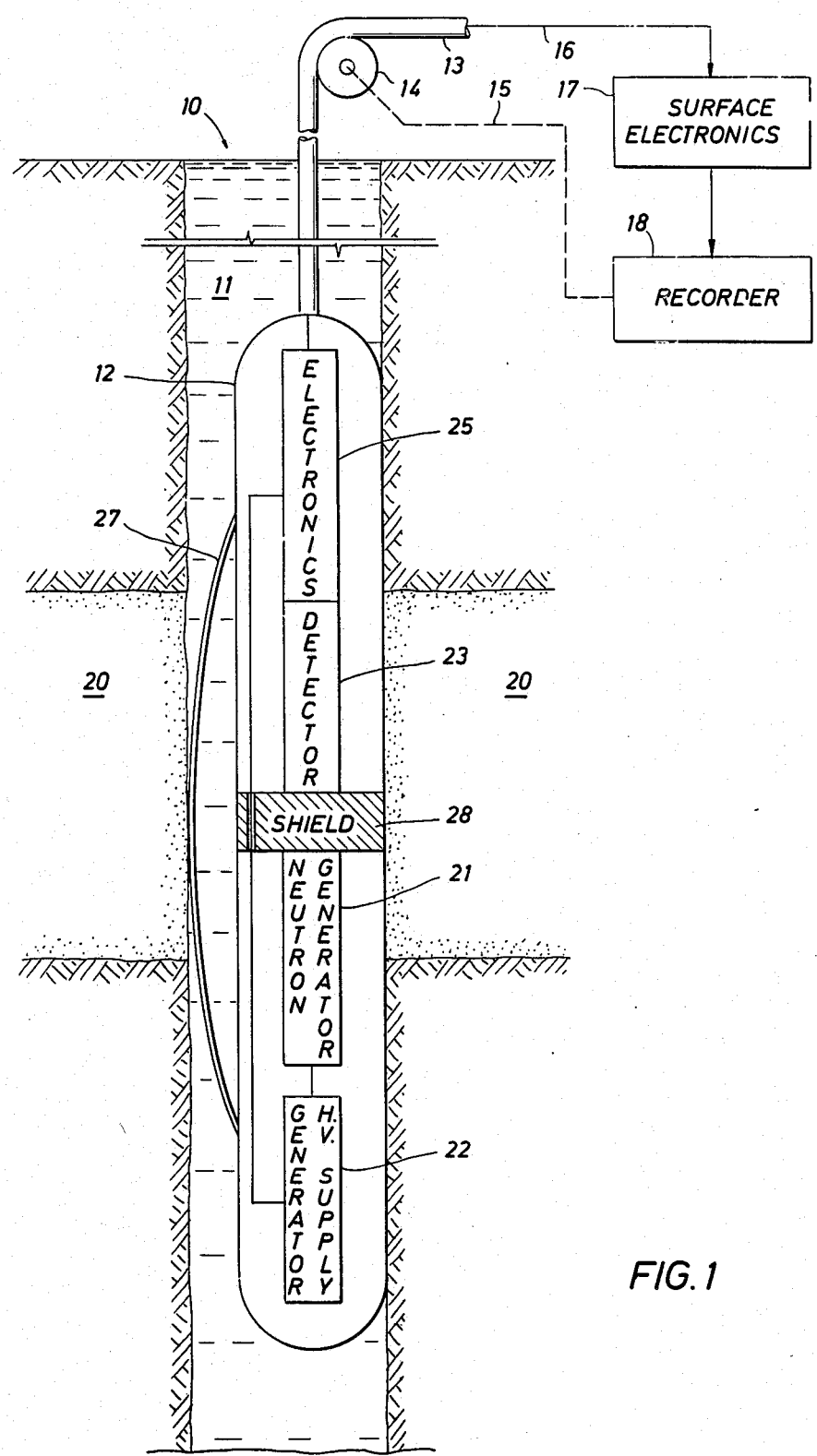
FIG. 1 is a schematic illustration showing a well logging system for performing earth formation porosity measurements in a borehole according to the present invention.

With reference to the drawings, the new and improved method for epithermal neutron porosity measurements according to the present invention will be described. FIG. 1 shows schematically a well logging system suitable for performing the present invention. As shown therein, a well borehole 10 is filled with a borehole fluid 11 and penetrates the earth formations 20 to be investigated. A downhole well logging sonde 12 is suspended in the borehole 10 by means of a conventional armored logging cable 13, in a manner known in the art. Cable 13 provides for raising and lowering the sonde through the borehole and contains one or more electrical conductors 16 for communicating between the sonde 12 and a surface electronics package 17, as desired.

A sheave wheel 14 at the surface, over which cable 13 passes, is electrically or mechanically coupled, as indicated by dotted line 15, to a well logging recorder 18. Recorder 18 may comprise an optical recorder or magnetic tape, or both, as known in the art, for recording the measurements made by the downhole sonde 12 as a function of the depth in the borehole of the sonde 12.

In the downhole sonde 12, a neutron generator 21, such as a deuterium-tritium accelerator, is supplied by a high voltage power supply 22 with high voltage (approximately 100 kilovolts) for its operation. Control and telemetry electronics 15 supply control signals to the neutron generator 21 and the high voltage supply 22, and telemeter information measured by the instrumentation in the downhole sonde 12 to the surface by means of the logging cable 13.

Longitudinally spaced from the neutron generator 21 is an epithermal neutron detector 23. In the preferred embodiment, detector 23 is a pressurized He counter and is wrapped with a cadmium shield to shield it from and absorb thermal neutrons. Detector 23 therefore detects those epithermal neutrons from the borehole and adjacent earth formations which result from moderation of the fast 14 Mev neutrons emitted by neutron generator 21. A neutron shielding material 28 having a high density matter content or large scattering cross-section is interposed between the neutron generator 21 and the detector 23, in order to prevent direct irradiation of the detector by neutrons emitted by the neutron generator 21.

Upon activation of the neutron generator 21, a relatively short burst or pulse of neutrons (see FIG. 2) is initiated and emitted into the well borehole 10, borehole fluid 11, and into the earth formations 20 being investigated. By a "short" burst is meant that the duration of the burst is short with respect to the epithermal decay time constant. At the same time the burst should not be so short as to adversely affect the performance or output of the neutron generator. For example, in a typical epithermal application with existing neutron generators, the pulse would be of the duration, but not be much shorter than, about five or six microseconds. Such bursts, in this example, would then have a repetition rate of about 20 kHz.

The burst of fast neutrons is moderated or slowed down to epithermal energies by elastic and inelastic scattering interactions with the nuclei of the materials in the borehole and surrounding earth formations. This creates repetitive bursts of populations of epithermal neutrons in the borehole and surrounding earth formations.

For optimum sensitivity to the epithermal neutron population in the surrounding earth formations, sonde 12 is preferably equipped with means for reducing the borehole hydrogen effect. In the preferred embodiment, this is a decentralizer spring 27 which holds the sonde at the edge of the borehole. Another way to reduce the borehole effects of hydrogen would be to displace hydrogen in the borehole around the tool with something else having a low hydrogen index. This could be accomplished, for example, with an air or nitrogen filled packer in the vicinity of the detector. Although shown in an uncased borehole in FIG. 1, the tool could also be decentralized in a cased and possibly cemented borehole.

Detector 23 then detects epithermal neutrons from both the borehole and the adjacent earth formations. The detected neutrons produce voltage pulses which are supplied to the electronics section 25, counted in a digital counter, and telemetered to the surface by conductor 16 in the well logging cable 13. At the surface, the surface electronics package 17 receives the telemetered information from the downhole sonde 12 and performs calculations as further described below to determine the porosity of the adjacent earth formations 20 being investigated. The surface electronics 17 then supplies signals representative of the various measured and calculated quantities to the recorder 18 where they are recorded as a function of borehole depth.

The counting and processing of the epithermal neutron signals is done as follows (see FIG. 4). At least two time intervals, or gates, are selected as generally known in thermal neutron measurement techniques. In the preferred embodiment each gate in fact terminates before the next begins. However, it is to be understood that the term "gate" encompasses a gate which could be mathematically derived, for example by taking two gates which in fact overlap in real time, one being longer than the other, and subtracting the shorter from the longer. The resulting difference would be the non-overlapping portion, and that portion, wherever it fell relative to the repetitive neutron pulses, would also be considered a gate within the terminology hereof.

In the present invention at least one of the gates preferably occurs substantially in the time interval between the repetitive pulses of fast neutrons. Depending upon whether the borehole epithermal neutron population has substantially died away, the neutrons which are detected may or may not include a borehole component, but will be representative at least of the epithermal neutron population in at least the surrounding earth formations.

As the neutrons are detected, count rate signals are generated for each gate representative of the corresponding neutron populations during those gates. These count rate signals are then combined according to relationships discussed below to obtain a measurement signal representative of the porosity of the surrounding earth formation. The measurement signals at a plurality of different depths are recorded by recorder 18 as a function of borehole depth.

When the gates occur at times following a burst of fast neutrons which are long relative to the borehole moderation time but short relative to the formation moderation time, most of the epithermal neutron in the borehole will have been thermalized before the measurement begins. In that case, as discussed above, the epithermal neutron decay distribution may be approximated by the following relationship:

$$E(t) = A_0 e^{-at/t_s}$$

where $A_o$ is a constant related to the initial number of neutrons emitted during the burst and the width and shape of the burst; $t_s$ is the slowing down (or moderation) time of the source neutrons in the formation, and is a constant. This equation, which assumes that the signals decay exponentially with time, is then solved by known techniques to provide the measurement signal.

When the gates occur at times following a burst of fast neutrons which are short relative to the borehole moderation time, the total epithermal neutron count rate expression then becomes:

$$E(t) = A_{oB}e^{-\alpha Bt/t_sB} + A_{oF}e^{-\alpha Ft/t_sF}$$

where the "B" and "F" subscripts relate to the borehole and formation components respectively. As this equation makes clear, the signals are assumed to represent the sum of two substantially independent neutron populations, one in the borehole and the other in the adjacent earth formations. Each population is assumed to decay exponentially with time at different rates.

Figure 4:
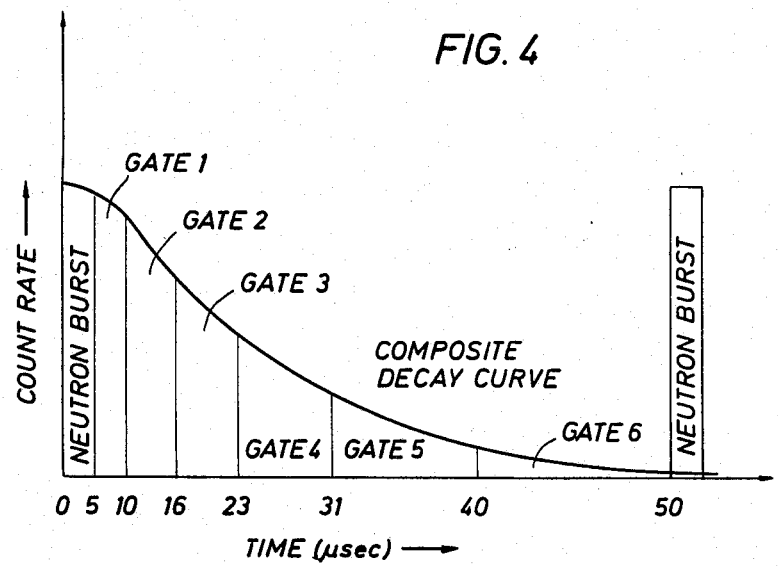
FIG. 4 is a graphical representation illustrating the composite epithermal neutron population decay curve and time gates according to one embodiment of the present invention.

To provide the measurement signal in this case, at least four, and preferably six, gates are taken substantially spanning the time of the borehole moderation and the formation moderation of the fast neutrons (see FIG. 4). The detected epithermal neutron populations are therefore representative of the epithermal neutron populations in both the borehole and the surrounding earth formations. These are then combined as more fully described and explained in the above-referenced U.S. patent application Ser. No. 383,680 to obtain a measurement signal representative of the porosity of the surrounding earth formations.

As set forth in the Ser. No. 383,680 application, the multiple time gates are preferably, but not necessarily, contiguous and occur during an essentially continuous time interval from one until the next of the repetitive neutron pulses. The multiple time gate measurements of the counting rates are then supplied to an epithermal neutron lifetime computer. The computer computes the formation and borehole epithermal neutron lifetime components by means of an iterative separable least squares fitting of this count rate data to exponential relationships assumed to exist for the borehole and formation components of epithermal neutron decay time. By this means the computer is enabled to calculate simultaneously both the borehole epithermal neutron lifetime component and the earth formation epithermal neutron lifetime component.

As also described more fully in the '680 application, the multiple time gates may be of equal duration, or, as shown in FIG. 4, the time interval of each gate may be of subsequently greater or equal duration than its predecessor time interval. This results in intervals which are chosen such that at least two of the time intervals maximize borehole component counts and at least two others minimize borehole component counts. The aim of lengthening subsequent intervals is to statistically optimize the counting rates in each of the gates. That is, as the composite epithermal neutron population decay curve falls off, the successively wider time gates allow more counts to occur at the lower counting rate of the later time gates. The slope of the curve changes more slowly in these regions as well, so that the longer gates fall, not only where the counts are lower, but where the subsequent mathematical fitting of the curve suffers less from the more widely spaced sample points on the curve.

In the present invention, the computational techniques taught in the Ser. No. 383,680 application may also be beneficially employed to derive at least two additional measurement signals representative of the amplitude of the borehole and formation components of the respective epithermal neutron populations. And, as will be apparent from the teachings thereof, the apparent hydrogen content and relative magnitudes of both the borehole and formation regions themselves can be determined. Further, these calculations may be enhanced by utilizing borehole and formation component parameters carried forward in time from previous measurement gates.

Epithermal neutron "lifetimes" are much shorter than thermal neutron lifetimes, and the gates and the bursts of fast neutrons must therefore be very short. In the preferred embodiment the bursts of fast neutrons are short and sharp, having a width such that the burst is narrow with respect to the decay constant being measured, such as a width of substantially five to six microseconds. The bursts may be provided at a frequency of from approximately 1.0 kHz up to 20 kHz, with the gates (which may include the burst period) for each cycle occuring within these intervals.

According to the present invention, not only is the shape of the die-away curve of the epithermal neutrons related to $t_s$, but the shape of the epithermal neutron build-up curve (i.e., prior to die-away) is as well. That is, in low porosity formations the epithermal neutron build-up rate is slower than in high porosity formations, due to the longer slowing down time in low porosity formations (there being less hydrogen to moderate the fast neutrons to epithermal energies). As taught herein, the effects of porosity upon build-up of the epithermal neutron population can be combined with the die-away information to produce an even more sensitive measurement of porosity than either build-up or die-away alone.

Figure 2:
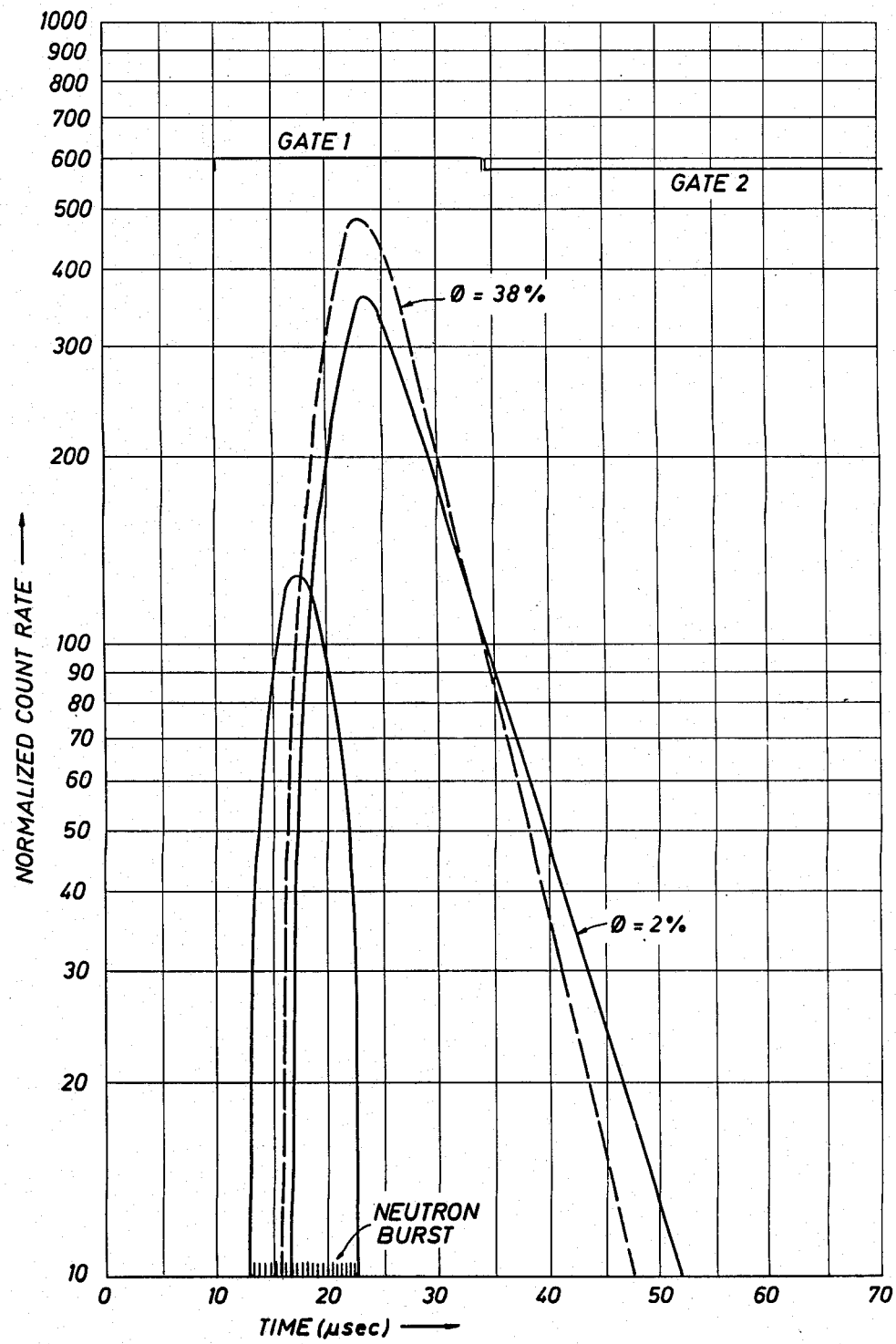
FIG. 2 is a graphical representation showing a burst of fast neutrons, the resulting normalized time distributions of epithermal neutrons in adjacent earth formations having porosities of 2% and 38%, and the preferred timing gates for measuring the ratios thereof.

Referring to FIG. 2, a graphical representation is given of a burst of fast neutrons and the resulting normalized time distributions of epithermal neutrons in adjacent earth formations having porosities of 2% and 38%. Also shown is a preferred time gating scheme for measuring the build-up and the die-away of the resulting epithermal neutron population. As may be seen, the first time gate has an interval substantially spanning the build-up of the epithermal neutron population and also the initial part of the die-away curve. The second time gate substantially spans the remainder of the die-away curve. The first gate thus starts several microseconds before the neutron burst and extends to about twelve microseconds thereafter. The second gate starts immediately at the end of the first and extends beyond the end of the die-away of the epithermal neutrons, for example, for about another fifty microseconds.

As shown in FIG. 2, the epithermal neutron population distribution for the 2% porosity peaks about 7 microseconds after the peak of the fast neutron burst, and then decays exponentially with a 7.7 microsecond decay constant. The epithermal neutron population distribution for the 38% porosity formation shows a 5.8 microsecond decay constant. A 26% porosity formation (not shown) was observed to have a 6.2 microsecond decay constant. Although these differences are significant, they might not be adequate in themselves, depending upon tool limitations and constraints, to yield a statistically accurate porosity measurement. For example, in one trial the integrated instantaneous count rate in the 2% porosity formation (i.e., the area under the curve) was approximately 150 counts per second, and that in the 38% porosity formation was about 60 counts per second.

Figure 3:
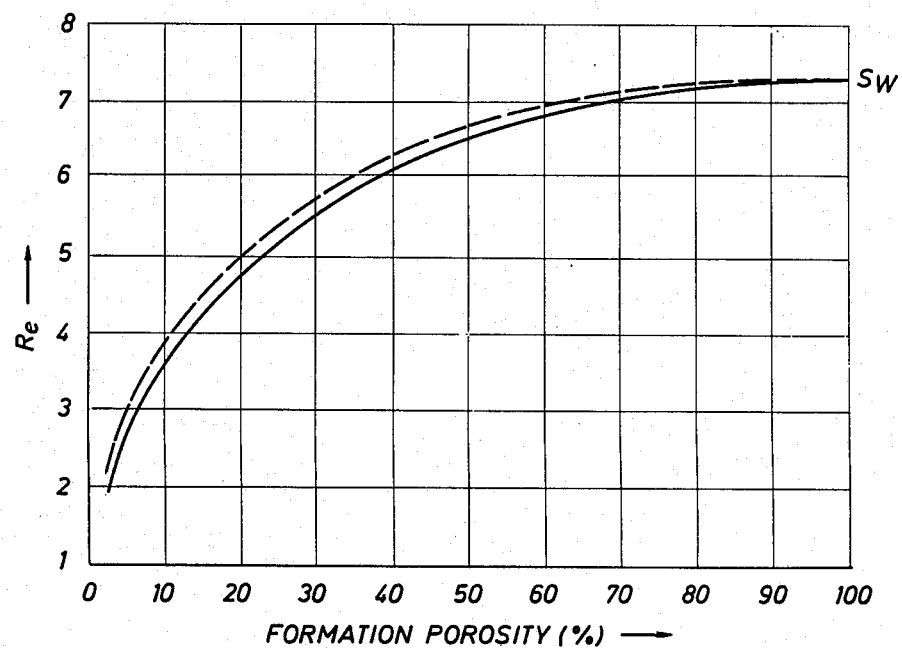
FIG. 3 is a graphical representation showing the build-up/die-away ratios vs. porosity of measurements produced using the gates shown in FIG. 2.

Comparing the overlayed curves for the 2% and 38% porosity formations (FIG. 2), it will be observed that, in addition to the differences in the die-away slopes, there are also differences in the build-up rates of the epithermal neutrons. These composite differences are quantified according to the present invention by taking the ratio of the epithermal neutron counts beginning at the burst and ending in the early part of the die-away curve (i.e., the first gate) to the counts in the latter portion of the die-away curve (the second gate). It has been found that such a ratio increases with increasing porosity, as shown in FIG. 3, since more hyrogen in the pore spaces causes the epithermal neutron population to build up faster (increasing the first gate count) and die away sooner (thereby decreasing the second gate count). For example, with the time gating arrangement shown, the resulting ratio increases about 85% between the 2% and the 38% porosity formation. This is in considerable contrast to the approximately 25% change in the observed die-away or decay constant alone between the same formations. Further, the statistical formation measurements are improved since count rate data from both the build-up and the die-away of the epithermal neutron population are utilized.

As may be seen, therefore, the present invention provides numerous advantages. It provides a neutron porosity measurement method which can be adapted to many existing borehole logging tools. The porosity measurement can be made using but one detector and is substantially insensitive to the gain stability of the detector and the overall output of the neutron generator. Further, in areas of known porosity, $t_s$ could be used to determine gas saturation of the reservoir, thus furnishing a clear distinction between gas and oil in a formation. The invention thus furnishes an accurate, sensitive, versatile, single-detector neutron porosity measurement method which is essentially lithology, salinity, shale, casing, and borehole independent.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for determining the porosity of earth formations in the vicinity of a borehole passing therethrough, comprising the steps of:
   (a) emitting, in a portion of the borehole substantially adjacent the formations of interest, repetitive pulses of fast neutrons for moderation to epithermal energies by interaction with nuclei of materials in the borehole and surrounding earth formations, creating thereby repetitive bursts of populations of epithermal neutrons in the borehole and surrounding earth formations, the borehole constituting a first zone and the surrounding earth formations a second zone,
   (b) detecting epithermal neutrons at a longitudinally spaced distance in the borehole during at least four predetermined time intervals substantially spanning the time of the borehole moderation and the formation moderation of the fast neutrons, said detected epithermal neutrons thereby being representative of the epithermal neutron populations in both said zones,
   (c) generating at least four count rate signals representative of said epithermal neutron populations during said at least four time intervals,
   (d) combining said at least four count rate signals according to a predetermined relationship in which said signals are assumed to represent the sum of two substantially independent epithermal neutron populations, one in each zone, which populations decay exponentially with time at different rates, to obtain a measurement signal representative of the porosity of the surrounding earth formation, and
   (e) recording said measurement signal as a function of borehole depth.

2. The method of claim 1 wherein at least six time intervals subsequent to each neutron pulse are used in said detecting step.

3. The method of claim 1 wherein said combining step is performed according to an iterative technique.

4. The method of claim 1 wherein said combining step includes a separable least squares fitting technique.

5. The method of claim 4 wherein said fitting technique further includes fitting to exponential relationships assumed to exist for borehole and formation components of epithermal neutron decay time.

6. The method of claim 1 further including the step of combining said at least four count rate signals to derive at least two additional measurement signals representative of the amplitude of borehole and formation components of the respective epithermal neutron populations.

7. The method of claim 1 wherein said combining step further comprises determining the apparent hydrogen content of both borehole and formation regions.

8. The method of claim 1 wherein said at least four time intervals extend over substantially the entire time interval from one pulse until the next of said repetitive neutron pulses.

9. The method of claim 1 further comprising furnishing pulses of fast neutrons wherein the pulses have durations which are short with respect to the epithermal decay time constant.

10. The method of claim 1 wherein said at least four time intervals are chosen such that at least two of the time intervals maximize borehole component counts and at least two others minimize borehole component counts.

11. The method of claim 10 wherein said at least four time intervals are of approximately equal duration.

12. The method of claim 10 wherein each of said at least four time intervals is of subsequently greater or equal duration than its predecessor time interval.

13. The method of claim 1 wherein said combining step utilizes borehole and formation component parameters carried forward in time from previous measurement gates.

14. The method of claim 1 further comprising reducing the borehole hydrogen effect.

15. The method of claim 1 further comprising the reducing the borehole hydrogen effect by detecting the epithermal neutrons substantially at the edge of the borehole by aid of a decentralizer means.

16. The method of claim 1 wherein said steps are performed repetitively at a plurality of different depths in the well borehole and produce a recording of measurement signals as a function of borehole depth.

* * * * *